United States Patent
Lange

(10) Patent No.: US 9,573,237 B2
(45) Date of Patent: Feb. 21, 2017

(54) DEVICE AND METHOD FOR GRINDING WORKPIECES, IN PARTICULAR WELDING ELECTRODES

(71) Applicant: Matuschek Messtechnik GmbH, Alsdorf (DE)

(72) Inventor: Elmar Lange, Gummersbach (DE)

(73) Assignee: Matuschek Messtechnik GmbH, Alsdorf (DE)

( * ) Notice: Subject to any disclaimer, the term of this patent is extended or adjusted under 35 U.S.C. 154(b) by 213 days.

(21) Appl. No.: 14/416,118

(22) PCT Filed: Aug. 30, 2013

(86) PCT No.: PCT/EP2013/067981
§ 371 (c)(1),
(2) Date: Jan. 21, 2015

(87) PCT Pub. No.: WO2014/033253
PCT Pub. Date: Mar. 6, 2014

(65) Prior Publication Data
US 2015/0183076 A1 Jul. 2, 2015

(30) Foreign Application Priority Data

Aug. 31, 2012 (DE) .......... 10 2012 215 532
Sep. 12, 2012 (DE) .......... 10 2012 216 108

(51) Int. Cl.
*B24B 5/24* (2006.01)
*B24B 19/16* (2006.01)
*B23K 11/30* (2006.01)

(52) U.S. Cl.
CPC ............ *B24B 5/24* (2013.01); *B23K 11/3063* (2013.01); *B24B 19/16* (2013.01)

(58) Field of Classification Search
CPC ........... B24B 5/24; B24B 19/16; B23K 11/30; B23K 11/3063

(Continued)

(56) References Cited

U.S. PATENT DOCUMENTS 2,300,173 A * 10/1942 Platz ................. B23K 11/3063
451/439
2,357,038 A * 8/1944 Whitesell, Jr. ..... B23K 11/3063
200/50.32

(Continued)

FOREIGN PATENT DOCUMENTS

| BE | 1011809 A3 | 1/2000 |
|---|---|---|
| DE | 169150 | 3/1906 |
| DE | 204783 | 12/1908 |
| DE | 212039 | 7/1909 |
| DE | 310379 | 1/1919 |
| DE | 1 137 974 | 10/1962 |
| DE | 1 925 720 U | 10/1965 |
| DE | 1 955 787 | 2/1967 |
| DE | 31 25 915 A1 | 1/1983 |
| DE | 227 073 B1 | 9/1985 |
| DE | 297 13 087 U1 | 10/1997 |
| DE | 197 20 233 A1 | 11/1997 |
| DE | 199 21 003 C2 | 11/1999 |
| DE | 199 52 183 A1 | 5/2001 |

(Continued)

OTHER PUBLICATIONS

A.M.D.P., "User's Manual Fixed to the Ground Electrodes'Gyrobuffer," Mar. 2007, 11 pgs.

*Primary Examiner* — Robert Rose
(74) *Attorney, Agent, or Firm* — Muirhead and Saturnelli, LLC

(57) ABSTRACT

A system for grinding workpieces includes a grinding wheel, a first support for rotatably supporting the grinding wheel about a first rotational axis, and a grinding wheel drive for rotating the grinding wheel. The first support can be rotated about a second rotational axis using a support rotating device, the first rotational axis being inclined relative to the second rotational axis such that the grinding wheel lies diagonally against the surface of the workpiece and grinds a substantially conical surface on the workpiece while rotating about the second rotational axis when the workpiece contacts the grinding wheel surface at a distance from the second rotational axis. A position adjusting device may move the first support along the second rotational axis. The angle of inclination between the first rotational axis and the second rotational axis may be adjusted using an inclination adjusting device.

23 Claims, 8 Drawing Sheets

(58) Field of Classification Search
USPC .................. 451/259, 278, 262, 270, 160, 28
See application file for complete search history.

(56) References Cited

U.S. PATENT DOCUMENTS

| | | | | |
|---|---|---|---|---|
| 5,001,868 | A | * | 3/1991 | Jankus ................... B24B 19/16 451/285 |
| 5,288,185 | A | * | 2/1994 | Mattsson ................ B23B 5/166 219/119 |
| 5,740,699 | A | | 4/1998 | Ballantyne et al. |
| 5,934,976 | A | | 8/1999 | Makino |
| 5,980,360 | A | | 11/1999 | Murray et al. |
| 6,195,860 | B1 | * | 3/2001 | Di Rosa ............. B23K 11/3063 29/33 R |
| 7,458,139 | B2 | * | 12/2008 | Nakazima ............... B23B 5/166 219/119 |
| 9,022,838 | B2 | * | 5/2015 | Tamm .................... B24B 19/16 451/294 |
| 2013/0288580 | A1 | | 10/2013 | Tamm |

FOREIGN PATENT DOCUMENTS

| | | |
|---|---|---|
| DE | 10 2009 044 855 A1 | 6/2011 |
| DE | 10 2012 221 553 A1 | 5/2014 |
| EP | 0 385 069 B1 | 9/1990 |
| EP | 0 589 565 A2 | 3/1994 |
| EP | 0 844 040 B1 | 5/1998 |
| EP | 0 867 253 B1 | 9/1998 |
| EP | 1 005 942 A1 | 6/2000 |
| EP | 1 270 134 B1 | 8/2006 |
| FR | 2 738 518 | 3/1997 |
| FR | 2 756 202 | 5/1998 |
| FR | 2 761 285 | 10/1998 |

* cited by examiner

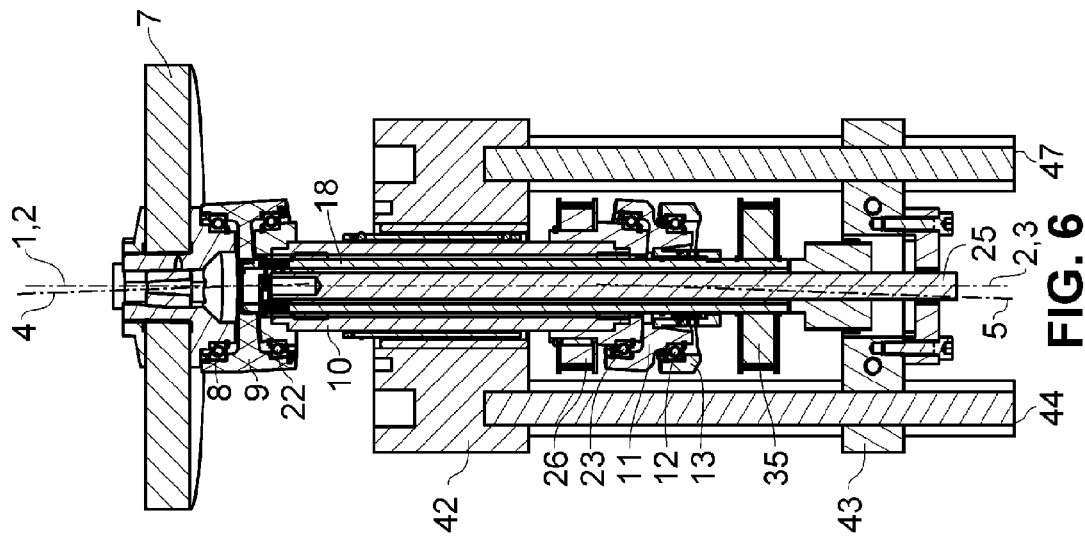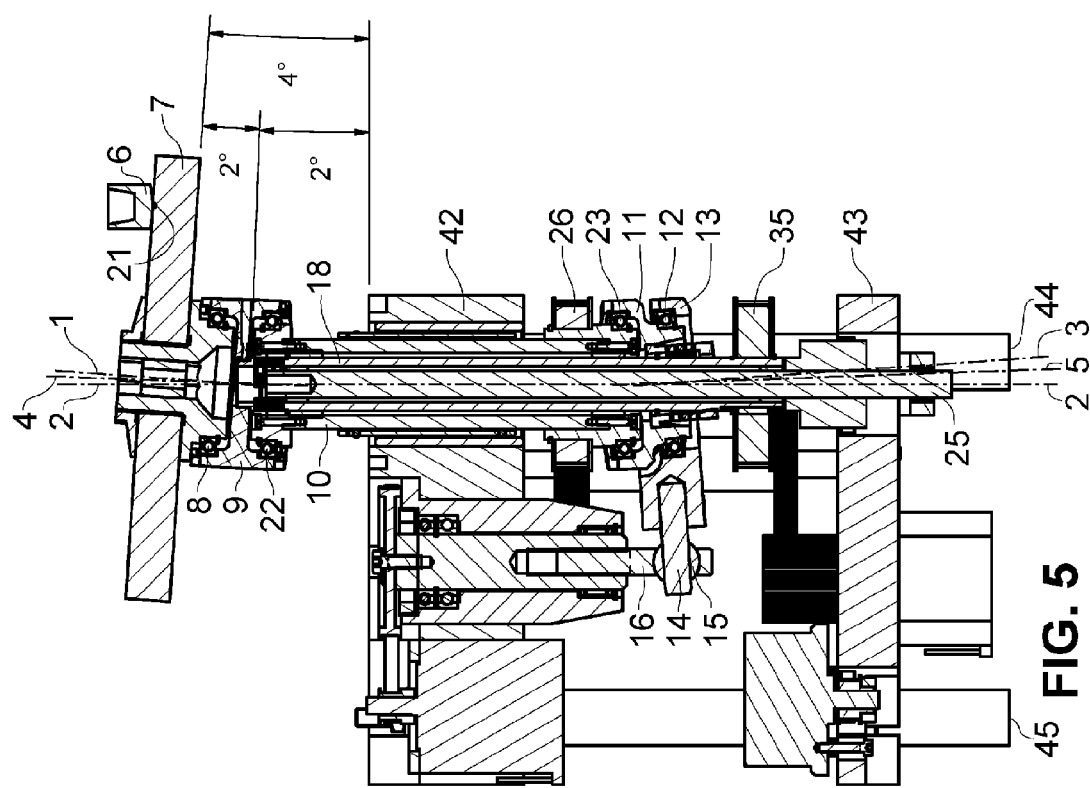
FIG. 6
FIG. 5

DEVICE AND METHOD FOR GRINDING WORKPIECES, IN PARTICULAR WELDING ELECTRODES

TECHNICAL FIELD

This application relates to a device for grinding solid workpieces, with
- a flat grinding wheel,
- a first bearing for the rotatable mounting of the grinding wheel about a first axis of rotation,
- a grinding wheel drive, which is coupled to the grinding wheel, for rotating the grinding wheel.

This application furthermore relates to a method for grinding solid workpieces, in which
- a flat grinding wheel is set into rotation about a first axis of rotation by a grinding wheel drive,
- the grinding wheel is mounted in a first bearing so as to be rotatable about the first axis of rotation.

This application relates to a device and to a method for grinding welding electrodes for resistance welding.

BACKGROUND OF THE INVENTION

During the resistance welding of metal sheets, electric currents with a high current strength are introduced into the sheets by two electrodes pressed against the outer surfaces of the sheets to be welded to each other. By this means, the metal of the sheets is melted and forms a weld nugget which connects adjacent sheets fixedly to each other. The welding electrodes are customarily composed of copper or copper alloys.

In particular in the case of aluminum resistance welding, the ideal shape and the cleanliness of the surface of the welding electrodes are a substantial prerequisite for producing a spot weld of high and reproducible quality. The surfaces of the welding electrodes can be impaired by deposits and wear even by welding a few spot welds, for example ten to twenty spot welds, and therefore the spot welds produced do not have the desired strength.

For this reason, welding electrodes are reworked at regular intervals such that the surfaces thereof have an optimum shape and are free from contaminations during each welding operation. A known method for reworking the surfaces of the welding electrodes is the grinding of the welding electrodes.

In order to grind the ends of flexible bristles of brushes, the document DE 297 13 087 U1 discloses a device in which a conical grinding wheel rotates about an axis of rotation and at the same time is pivotable in a manner revolving about a second axis running obliquely with respect to the axis of rotation. The angle of slant of the second axis corresponds to the angle of taper of the grinding wheel, and the flexible bristles are pressed against the grinding wheel substantially at the intersecting point of the second axis with the surface of the grinding wheel. Because of the angle of slant and angle of taper being identical in value, this results substantially in a horizontally running surface of the grinding wheel in the area of contact with the bristles when the second axis runs vertically. By means of the revolving pivoting of the grinding wheel, the direction of the grinding movement of the surface of the grinding wheel can be changed, and therefore the ends of the flexible bristles, which are bent in the direction of rotation of the grinding wheel by the latter, are ground from all sides, and a grinding result with bristle ends which are approximately hemispherically rounded is produced. Such a procedure is not possible in the case of solid, non-flexible workpieces, since the latter are not bent by the grinding force.

The company AMDP S.A.S. from Croissy-sur-Seine provides a grinding device for welding electrodes, in which a flat grinding wheel is fastened to a rigid rotary spindle which is set into rotation by a drive motor. The drive motor is located in a housing, the upper end of which is fastened pivotably to a frame. A wobble-type drive moves the lower end of the housing on a circular path, and therefore the rotary spindle accommodated in the housing executes a wobbling movement in order to produce a conical electrode surface on the electrode with the grinding wheel. This device has a positionally fixed position of the wobbling grinding wheel, and therefore the welding electrodes have to be pressed against the grinding wheel, for example by means of a robot arm carrying the welding tongs with the electrodes, for the machining. This requires highly complicated programming of the robot arm.

Accordingly, it would be desirable to provide an improved device and a method of the abovementioned type for solid workpieces, which automatically permit the production of surfaces which are not flat. If the machined workpiece is a welding electrode, the device and the method are intended to permit, at as high a speed as possible, the production of a conical or cap-shaped electrode surface, which is optimally suitable for the welding operation.

SUMMARY OF THE INVENTION

According to the system described herein, a first bearing is rotatable about a second axis of rotation by means of a bearing rotation device, wherein the first axis of rotation is inclined with respect to the second axis of rotation such that the grinding wheel bears obliquely against the surface of the workpiece and grinds, during the rotation about the second axis of rotation, a substantially conical surface to the workpiece when the latter is in contact with the grinding wheel surface at a distance from the second axis of rotation.

In other words, the machine-side bearing shell which mounts the grinding wheel rotatably about the axis of symmetry thereof is held rotatably by means of the bearing rotation device, wherein the bearing plane of the bearing rotation device is tilted with respect to the bearing plane of the first bearing for the grinding wheel. During the rotation by means of the bearing rotation device, the first axis of rotation of the first bearing for the grinding wheel wobbles, that is to say, said first axis of rotation moves along a conical surface, wherein the point of said conical surface lies in the intersecting point of the first axis of rotation and the second axis of rotation. The surface of the grinding wheel extends in the plane of the grinding wheel substantially perpendicularly to the first axis of rotation, about which the grinding wheel rotates. This wobbling of the first axis of rotation of the first bearing for the grinding wheel makes it possible to hold the surface of the grinding wheel obliquely against the surface of the workpiece when the workpiece is fed in a direction parallel to the second axis of rotation and at a distance therefrom, wherein the slant of the grinding wheel changes with the rotation of the bearing rotation device. The grinding wheel here can grind the surface of the workpiece at a constant angle of slant, and therefore a substantially conical surface is produced on the workpiece.

In practice, a first actuator can bring about the rotation of the first bearing by means of the bearing rotation device. The wobbling of the first bearing axis can thereby be automated, and the device according to the system described herein, driven by a motor, can produce a conical surface for the workpiece.

In practice, the bearing rotation device can have a first bearing holder in which the first bearing is arranged and which is rotatable about the second axis of rotation. The actuator can then act on the first bearing holder.

In practice, the second axis of rotation is inclined by less than 15°, in particular by less than 10°, with respect to the first axis of rotation of the grinding wheel.

Furthermore, a position adjustment device which moves the bearing substantially along or parallel to the second axis of rotation can be provided in practice. In order to explain the effect of the position adjustment, it is assumed that the second axis of rotation runs vertically although, in practice, the orientation of the second axis of rotation can be as desired. If it is assumed that the welding electrode is likewise oriented perpendicularly parallel to the second axis of rotation during the grinding, the plane of the grinding wheel is then inclined with respect to the horizontally running, radial plane of the welding electrode by the value of the inclination of the first axis of rotation with respect to the second axis of rotation. This requires the surface of the grinding wheel to run substantially perpendicularly to its own axis of rotation, i.e. the first axis of rotation of the device. When the bearing rotation device rotates about the second axis of rotation, the height of the surface of the grinding wheel changes continuously and periodically at each location which is at a distance from the second axis of rotation. It is endeavored to hold the workpiece in a fixed position during the grinding operation. By means of the position adjustment device for the first bearing, which supports the grinding wheel, the position of the grinding wheel surface which is in contact with the workpiece can be set at any time in such a manner that, after a revolution of the bearing rotation device through 360°, the family of contact lines between obliquely positioned grinding wheel and workpiece forms a flat cone, the cone axis of which runs substantially perpendicularly and therefore parallel to the second axis of rotation for the bearing rotation device.

With expensive, multi-axial industrial robots, kinematics of this type can be produced by suitable programming. However, a robot arm for grinding simple workpieces, such as welding electrodes, is very expensive. Accordingly, inter alia, the system described herein provides a cost-effective device for grinding workpieces, such as welding electrodes.

For this reason, the position adjustment device can have the following in practice:
  a connecting shaft which is rotatable about the second axis of rotation, is axially displaceable and is connected to the first bearing holder,
  a second bearing holder which is connected to the connecting shaft,
  a retaining ring with a second bearing on which the second bearing holder is mounted so as to be rotatable about a third axis of rotation, wherein the third axis of rotation is inclined with respect to the second axis of rotation of the connecting shaft,
  a fastening pin which is fastened to the retaining ring and is mounted pivotably in or on an abutment.

In other words, the first bearing for the grinding wheel is connected via the bearing rotation device and a connecting shaft to a retaining ring. The retaining ring has a second bearing in which the connecting shaft is mounted. The third axis of rotation of said second bearing is inclined with respect to the second axis of rotation of the connecting shaft. The inclination is transmitted to a fastening pin which is fastened to the retaining ring and is mounted pivotably in an abutment.

In practice, the value of the angle of inclination of the third axis of rotation with respect to the second axis of rotation of the connecting shaft can correspond to the value of the angle of inclination of the first axis of rotation with respect to the second axis of rotation of the connecting shaft. The retaining ring is consequently inclined with respect to the axis of rotation of the connecting shaft in a manner corresponding to the bearing of the grinding wheel. The fastening pin of the retaining ring can in practice be mounted pivotably on an abutment, but at a constant height, wherein the abutment is located within the diameter of the grinding wheel. Since the value of the inclination of the retaining ring corresponds to the value of the inclination of the grinding wheel and, within the diameter of the grinding wheel, a point, which is fixedly connected to the retaining ring, in the region of the abutment is at a constant height, said kinematics are transmitted to the grinding wheel. This leads to a point in the region of the grinding wheel also being constantly at one height during the wobbling movement of the first axis of rotation thereof. In particular if the workpiece is a welding electrode in the form of a cylindrical pin, the axis of symmetry of which extends substantially parallel to the second axis of rotation and runs through the point of constant height in the region of the grinding wheel, the grinding wheel moves cyclically because of the bearing rotation device and the position adjustment device in such a manner that, when the bearing rotation device revolves, the contact lines between grinding wheel and workpiece form a cone on the end surface of the workpiece. In the event of an inclination of the second axis of rotation of less than 10° with respect to the first axis of rotation, the cone is very truncated with an opening angle of more than 160°.

In practice, the fastening pin can furthermore be mounted displaceably in the axial direction thereof in the abutment. This compensates for the shifting of the position during the rotation of the connecting shaft. At the same time, during the rotation of the connecting shaft, a shifting of the center point of the grinding wheel with respect to the second axis of rotation of the connecting shaft also arises, and therefore the radial distance of the contact point of the workpiece with respect to the center point of the grinding wheel changes during the machining and, as a result, a greater region of the grinding wheel is used for machining the workpiece.

Finally, the device can in practice have an inclination adjustment device with which the value of the angle of inclination between the first axis of rotation and the second axis of rotation is adjustable. By this means, the angle with which the grinding wheel makes contact with the workpiece can be changed. The angle of taper of the cone machined by means of the grinding wheel by rotation of the bearing rotation device can thus be changed. In the simplest embodiment, the inclination adjustment device can be changeable manually and/or when the grinding wheel is at a standstill. Thus, by actuation of the inclination adjustment device, a different angle of taper of the cone produced by the grinding wheel during a complete revolution of the bearing rotation device can be set.

In practice, the inclination adjustment device can also be designed in such a manner that, at all times, the value of the angle of inclination between the first axis of rotation and the second axis of rotation corresponds to the value of the angle of inclination between the second axis of rotation and the third axis of rotation. Consequently, the inclination adjustment device is designed in such a manner that the two angles of inclination are set simultaneously to the same values. The adjustment range of the angle of inclination can in practice be between 0° and a maximum value of approximately 8 to 10°.

In particular, the inclination adjustment device is designed in practice in such a manner that the adjustment of the inclination can take place during the rotation of the grinding wheel and during the machining of a workpiece.

Consequently, by means of the inclination adjustment device, the angle of inclination of the grinding wheel can be adjusted continuously between 0 and a maximum value, for example 8°, with respect to the second axis of rotation during the grinding. Said inclination adjustment device consequently makes it possible to set different angles of inclination with respect to the radial plane of the workpiece for the grinding wheel during consecutive revolutions of the bearing rotation device. Consequently, the grinding wheel can not only produce a surface along a truncated cone with a fixed angle of taper, but, by means of continuous or stepwise changing of the angle of inclination during the machining, can produce a curved, approximately spherical surface.

A surface of this type is highly advantageous in particular for a welding electrode for aluminum resistance welding. Best welding results can be achieved with a slightly convex, spherical electrode surface without contaminations and with a homogeneous structure.

The realization of the inclination adjustment device by means of a multi-axial robot arm is also possible in this case, but is very expensive. In practice, it is endeavored to realize the inclination adjustment device in a cost-effective manner with simple mechanical means.

For this purpose, the inclination adjustment device can have the following:
  a first intermediate bearing with which the first bearing holder is fastened to the connecting shaft so as to be rotatable about a fourth axis of rotation;
  a second intermediate bearing with which the second bearing holder is fastened to the connecting shaft so as to be rotatable about a fifth axis of rotation,
  the fourth axis of rotation and the fifth axis of rotation are in each case inclined with respect to the second axis of rotation of the connecting shaft,
  a second actuator which brings about a rotation of the connecting shaft in relation to the first and second bearing holder.

In other words, the two bearing holders are fastened rotatably to the connecting shaft, wherein the axis of rotation of the bearing holders is inclined with respect to the axis of rotation of the connecting shaft. In particular, in practice, the value of the angle of inclination between the fourth axis of rotation and the second axis of rotation can correspond to the value of the angle of inclination between the fifth axis of rotation and the second axis of rotation. This produces a symmetry of the angles of inclination with respect to the axis of symmetry of the connecting shaft.

In practice, the angles of inclination of the axes of rotation of parts mounted rotatably with respect to one another can preferably in each case have the same value. In one practical embodiment, this value is 4°. The first axis of rotation of the grinding wheel is thus inclined by 4° with respect to the fourth axis of rotation of the first bearing holder. The fourth axis of rotation of the first bearing holder is in turn inclined by 4° with respect to the second axis of rotation of the connecting shaft. These two angles can be inclined in the same direction depending on the rotational position of the bearing holder with respect to the connecting shaft. In this case, the overall inclination of the first axis of rotation of the grinding wheel is 8° with respect to the second axis of rotation of the connecting shaft. However, the angles of inclination may also be opposed with respect to one another if the first bearing holder is rotated through 180° with respect to the connecting shaft such that the angles of inclination neutralize one another. In this rotational position, the angle of inclination of the first axis of rotation of the grinding wheel with respect to the second axis of rotation of the connecting shaft is 0°. By continuous rotation of the bearing holder with respect to the connecting shaft, any intermediate values of the angle of inclination between the first and the second axis of rotation can be continuously achieved.

At the other shaft end of the connecting shaft, the second bearing holder is formed in a corresponding manner. The angle of inclination between the fifth axis of rotation of the second bearing holder in relation to the second axis of rotation of the connecting shaft is 4°, and the angle of inclination of the third axis of rotation of the retaining ring with respect to the fifth axis of rotation of the second bearing holder is likewise 4°. In practice, the rotational movement of the first bearing holder and the rotational movement of the second bearing holder can be coupled to each other. In other words, during rotation of the first bearing holder, the second bearing holder is rotated at the same time by means of the coupling.

The intermediate bearings can also be coupled to one another by being fastened to the connecting shaft for rotation therewith. When the connecting shaft rotates, the bearing rings of the two intermediate bearings at the two ends of the connecting shaft rotate at the same time, which bearing rings are inclined with respect to the radial plane of the connecting shaft. The coupling of the two bearing holders is such that the inclined axis of rotation thereof for mounting on the connecting shaft, that is to say, the fourth axis of rotation and the fifth axis of rotation, lie in a common plane in every rotational position of the bearing holders. This ensures that the kinematics and the angular position of the upper bearing holder, to which the bearing for the grinding wheel is fastened, are transmitted to the lower bearing holder with the bearing for the retaining ring. In other words, the values of the angle of inclination of the first axis of rotation of the grinding wheel and of the third axis of rotation of the retaining ring are in each case adjusted synchronously with respect to the second axis of rotation. The value of the angle of inclination of the first axis of rotation with respect to the second axis of rotation and the value of the angle of inclination of the third axis of rotation with respect to the second axis of rotation are identical at all times, and the first and third axis of rotation run in a common plane. By this means, even during adjustment of the angles of inclination it is ensured that, at a predetermined point in the region of the grinding wheel when the bearing rotation device rotates, the surface of the grinding wheel moves on a conical surface, the axis of which substantially intersects with the abovementioned point. Even when the angle of taper is adjusted by the inclination adjustment device, the position of the point does not change.

In a practical embodiment, the first actuator and the second actuator can be driven by a common drive motor. The rotational speed of the common drive motor, which is connected to the gear input shaft, can be converted into two output rotational speeds, which can slightly differ from each other (for example by 1-4%), via a gearing, for example a mechanical gearing. This then produces a continuous adjustment of the inclination. At identical output rotational speeds, a constant angle of inclination, which can be adjusted by rotating the gear output shafts with respect to each other, is produced.

In another embodiment, the first actuator for rotating the first bearing, in particular the first bearing holder, and the second actuator for rotating the connecting shaft with the two intermediate bearings can be numerically controlled such that, during the grinding operation, predefined programs which predetermine the movement of the grinding wheel can be run. In particular, during a grinding operation, the connecting shaft is rotated at least once by a value of 180° with respect to the two bearing holders. During this operation, the inclination of the grinding wheel passes through the entire inclination range from 0° up to the maximum angle of inclination (in the case of the example described above −8°). The entire arrangement with the two bearing holders and the connecting shaft is rotated continuously here such that, as the inclination slowly increases or decreases, the grinding wheel wobbles in a rapid sequence in such a manner that the contact lines thereof form conical surfaces with a different inclination with the workpiece. At the end of the machining, a spiral line of consecutive machining points which together approximately form a spherical surface arises on the surface of the workpiece. In order to machine the surface of the workpiece, the grinding wheel is rotated at a very much higher rotational speed than the connecting shaft or the bearing holders.

In practice, a pressing drive, with which the grinding wheel is pressed against the workpiece, can furthermore be provided. The pressing drive shifts the grinding wheel substantially parallel to the second axis of rotation of the connecting shaft.

During the machining of the workpiece, the power and therefore the torque of the grinding drive is preferably detected. The pressing drive can be controlled in such a manner that, when a predetermined value of the torque of the grinding wheel drive is reached, the pressing drive is stopped. In practical embodiments, the pressing drive can be formed by any linear drive which shifts the abutment for the retaining ring in the direction of the second axis of rotation of the connecting shaft. For example, a threaded spindle with a motor-drivable adjustment nut has proven successful in practice as the pressing drive. The pressing force of the pressing drive is proportional via the coefficient of friction of the grinding wheel to the torque of the grinding wheel drive. With suitable drive motors, the power and therefore the torque of the grinding wheel drive can be determined in a simple manner from the values of the currents and voltages absorbed by the drive motor. Consequently, control of the pressing drive via said torque value is highly precise and ensures an optimum pressing force for machining the workpiece surface.

The pressing drive additionally has the advantage that the grinding wheel is not positionally fixed and can be moved against the workpiece. In this case, all that is required is to bring the workpiece into a predetermined position and to move the grinding wheel with the pressing drive against the workpiece. During the machining of the opposite electrodes of welding tongs, it suffices to move the electrodes with a robot arm which carries the welding tongs to a certain position on both sides of the grinding wheel. The shifting of the grinding wheel for beginning and carrying out the grinding operation on the two welding electrodes can then take place by means of the pressing drive, and therefore the robot arm is not complicated to program in order to bring about the relative movement between electrodes and grinding wheel during the grinding operation. In addition, the construction of the proposed device with a first bearing, which is rotatable about the second axis of rotation by means of the bearing rotation device in order to produce the conical surface on the end side of the workpiece, is very compact. The device can be arranged in any orientation, and therefore the device can be installed in each case in a production facility wherever the space conditions are the most favorable. In addition, the device can also be arranged with a horizontal axis of rotation of the grinding wheel. The surface of the grinding wheel then runs approximately vertically. This has the advantage that grinding dust does not collect on the surface of the grinding wheel, but rather drops down. The risk of soiling of the grinding wheel surface is thereby reduced.

With respect to the method, the system described herein provides that the first bearing for the grinding wheel is rotated about a second axis of rotation, wherein the first axis of rotation is inclined with respect to the second axis of rotation such that the grinding wheel bears obliquely against the surface of the workpiece and grinds, during rotation about the second axis of rotation, a substantially conical surface to the workpiece when the latter is in contact with the grinding wheel surface at a distance from the second axis of rotation. In practice, the first bearing can be moved substantially along the second axis of rotation by a position adjustment device.

Furthermore, in practice, the value of the angle of inclination between the first axis of rotation and the second axis of rotation can be adjusted by means of an inclination adjustment device.

Finally, the position adjustment device can be coupled to the inclination adjustment device, and therefore the position adjustment device brings about a periodic bearing movement, which movement is coupled to the rotation of the first bearing about the second axis of rotation, with an amplitude which increases as the angle of inclination increases. In particular in the event of a coupling of the above-described type, the bearing wheel executes a movement, in which, with a complete rotation of the first bearing about the second axis of rotation, the contact lines of the grinding wheel form a conical family with the workpiece, wherein the angle of taper increases with the angle of inclination.

In a first grinding operation, the first side of the grinding wheel can press against a first workpiece, and, in a second grinding operation, the second, opposite side of the grinding wheel can press against a second workpiece. This is of advantage in particular when grinding the two mutually opposite welding electrodes on welding tongs. The welding tongs can be supplied in an open position to the grinding device in such a manner that the end side of the first electrode faces the first side of the flat grinding wheel and the end side of the second electrode faces the second side. The pressing drive can then shift the grinding wheel first of all in a first direction parallel to the second axis of rotation towards the first electrode and can press the grinding wheel against the first electrode until the latter has been completely machined by the grinding wheel and the end side of the electrode has obtained the desired conical shape or cap shape, if the angle is changed. The pressing drive can subsequently shift the grinding wheel in the opposite direction parallel to the second axis of rotation towards the second electrode and can press the grinding wheel against the second electrode until the latter has been completely machined by the grinding wheel. An actuation or movement of the welding tongs is not required during this entire operation.

BRIEF DESCRIPTION OF THE DRAWINGS

Embodiments of the system described herein will be further explained in more detail below with reference to the attached drawings.

FIG. 5 and FIG. 6 show a sectioned side view and a front view of the grinding device from the preceding figures with a medium slant of the grinding wheel.

DETAILED DESCRIPTION OF VARIOUS EMBODIMENTS

Figure 1:
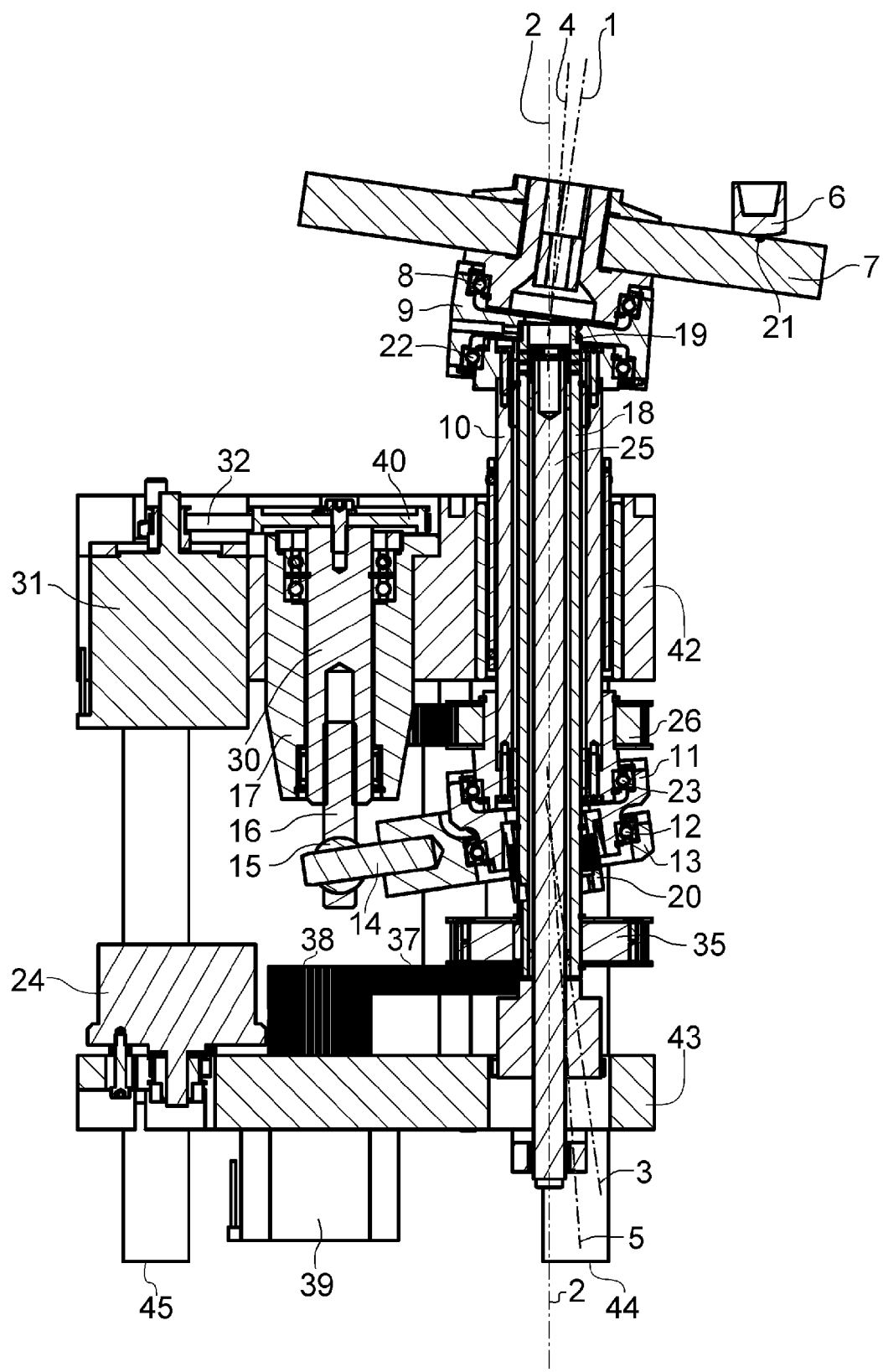
FIG. 1 shows a sectioned side view of the grinding device according to an embodiment of the system described herein.
Figure 2:
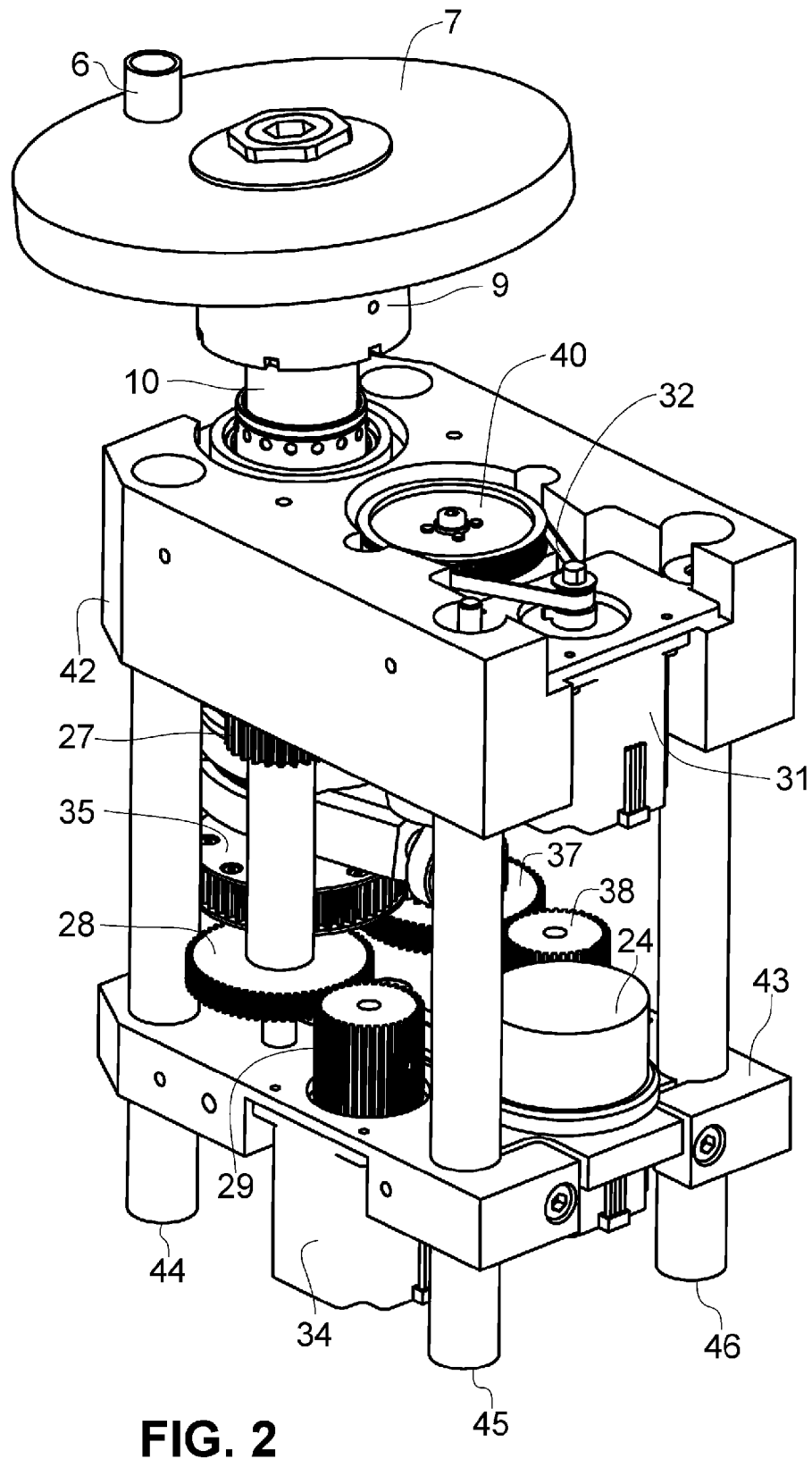
FIG. 2 shows a perspective top view of the grinding device from FIG. 1.

FIGS. 1 and 2 show a grinding device according to the system described herein for machining a workpiece, in the present case a welding electrode 6 made of copper or a copper alloy, by means of a grinding wheel 7. The flat grinding wheel 7 has an upper side and a lower side, which run parallel to each other and perpendicularly to the axis of rotation and which have abrasive material. Both the flat upper side and the flat lower side can form a grinding surface of the grinding wheel 7. The grinding wheel 7 is preferably composed of an elastic basic material in which abrasive material is embedded. The welding electrode 6 is customarily fastened to an electrode holder of welding tongs carried by a robot arm. The robot arm can move the welding tongs into different positions in space, inter alia into the position in which the welding electrode 6 makes contact with the grinding wheel 7, shown in FIG. 1. Welding tongs customarily have two welding electrodes, which can be pressed against each other, on two mutually opposite electrode holders. The second electrode on the lower electrode holder can be pressed from below against the lower side of the grinding wheel 7. Welding tongs and electrode holders are not illustrated in the attached figures.

The entire device is mounted on a mounting frame with an upper mounting plate 42 and a lower mounting plate 43 (see FIG. 2). The two mounting plates 42, 43 are connected to each other by four struts 44-47 in the region of the corners of the mounting plates 42, 43. The lower ends of the struts 44-47 form standing feet of the mounting frame.

The grinding wheel 7 is mounted so as to be rotatable about a first axis of rotation 1 by means of a first bearing 8. The first bearing 8 is arranged on a first bearing holder 9 which is fastened to the upper end of a hollow connecting shaft 10. A second bearing holder 11 with a second bearing 12 is located at the lower end of the connecting shaft 10. The second bearing 12 mounts a retaining ring 13 so as to be rotatable about a third axis of rotation 3 with respect to the connecting shaft 10. A fastening pin 14 which is accommodated in a pivotable and axially displaceable manner in an abutment 15 is fastened to the retaining ring 13. The abutment 15 consists of a ball with a joint eye in which the fastening pin 14 is inserted in an axially displaceable manner. The fastening pin 14 is fixedly connected to the retaining ring 13, for example, by means of a press fit, a threaded connection or an adhesive bond.

Figure 9:
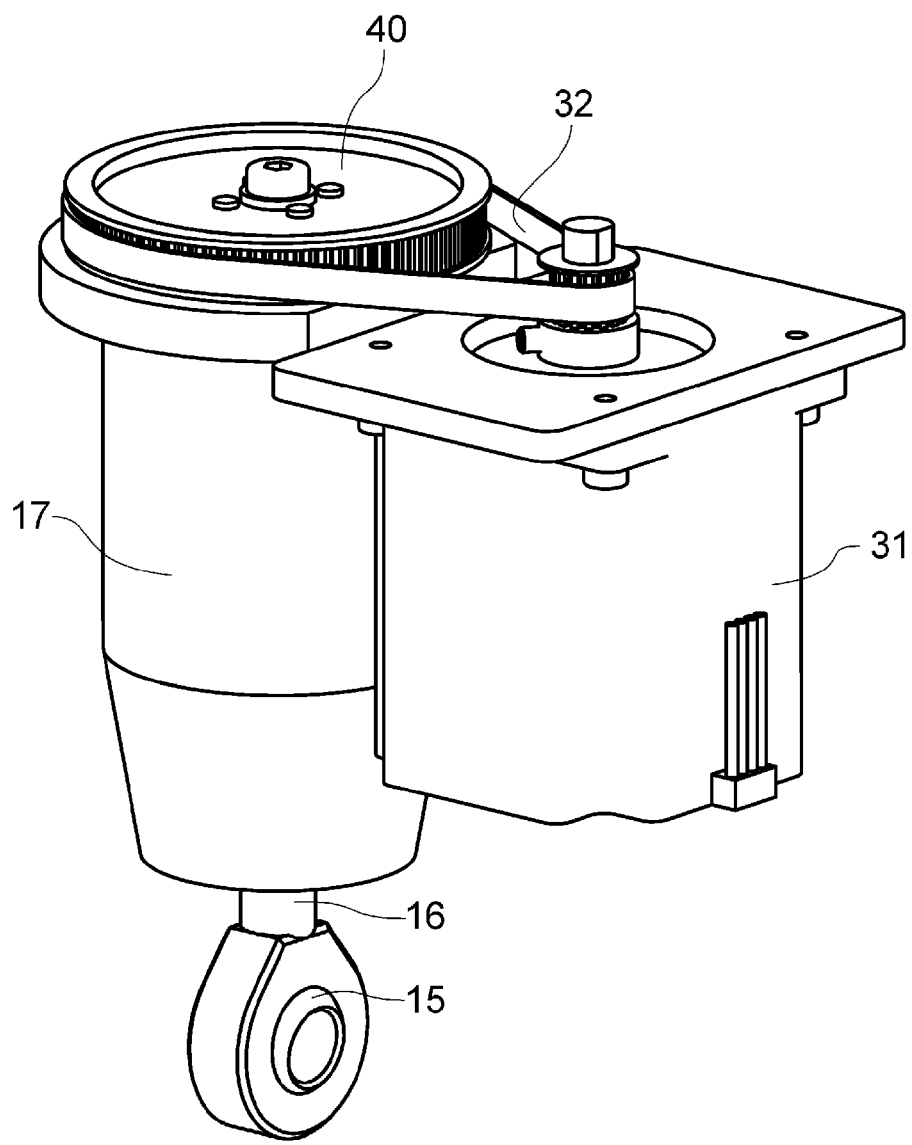
FIG. 9 shows an isolated perspective illustration of the pressing drive.

The abutment 15 is fastened to a lifting rod 16 which can be moved upwards and downwards and consequently parallel to the second axis of rotation 2 of the connecting shaft 10 by a linear drive 17. The grinding wheel 7 is moved towards the workpiece 6 or away from the workpiece 6 by means of this lifting rod 16. The linear drive 17 consequently forms a pressing drive which presses the grinding wheel 7 against the workpiece 6. In the present case, the lifting rod 16 of the linear drive 17 is formed by a threaded spindle which is held in a rotatable spindle nut 30. A drive motor 31 rotates a belt pulley 40 on the spindle nut 30 via a toothed belt 32 and a gearwheel and thus brings about a lifting and lowering of the lifting rod 16. The drive motor 31 with toothed belt 32 and linear drive 17 with lifting rod 16 are illustrated in isolated form in FIG. 9.

The two bearing holders 9 and 11 are connected to each other via a coupling shaft 18. The coupling shaft 18, for its part, is hollow and is arranged within the connecting shaft 10. It is ensured by means of the coupling shaft 18 that the rotational movements of the two bearing holders 9 and 11 are coupled to each other. If one of the two bearing holders 9 and 11 rotates by an angular value in one direction, the other is rotated at the same time by the same value in the same direction. The ends of the coupling shaft 18 are connected to the bearing holders 9 and 11 via slotted elastic connecting elements 19, 20 because the angle between the coupling shaft 18 and the bearing holders 9 and 11 is changed by means of an inclination adjustment device described further below. The connecting elements 19, 20 can alternatively be designed as universal joints.

If the connecting shaft 10 is rotated synchronously with the coupling shaft 18 and the two bearing holders 9 and 11, which are fastened thereto, at a uniform angular velocity, it can be seen that the first axis of rotation 1 of the grinding wheel 7 is moved on a conical surface about the second axis of rotation 2 of the connecting shaft 10. The orientation of that surface of the grinding wheel 7 which bears against the workpiece 6 is changed in the process. At the same time, the third axis of rotation 3 of the second bearing 12 rotates on the retaining ring 13 such that the latter changes the orientation thereof in space. The fastening pin 14 which is fixedly connected to the retaining ring 13 is supported in the abutment 15. The retaining ring 13 executes a wobbling movement here which substantially corresponds to the wobbling movement of the grinding wheel 7. Since the fastening pin 14 of the retaining ring 13 is mounted in the abutment 15, the connecting shaft 10 is raised and lowered in the process. In the position illustrated, the connecting shaft 10 is at its uppermost position, and therefore it is lowered upon further rotation of the bearing holders 9 and 11.

Owing to the geometry selected, in particular owing to the fact that the inclination of the first axis of rotation 1 with respect to the second axis of rotation 2 of the connecting shaft 10 has the same value, but an opposite orientation with respect to the inclination of the third axis of rotation 3 of the retaining ring 13 with respect to the second axis of rotation 2 of the connecting shaft 10, a point 21 is produced in the region of the grinding wheel 7 on the side opposite the abutment 15, said point being at a constant height during the rotation of the bearing holders 9 and 11. The grinding wheel 7 wobbles about said point 21, and therefore said grinding wheel machines the workpiece 6 on a conical surface with a truncated angle of taper during a full revolution of the bearing holders 9 and 11. The family of contact lines of the grinding wheel 7 with the cylindrical welding electrode, which forms the workpiece 6, produces the conical surface with the cone axis at the point 21.

The angle of taper of the ground surface of the workpiece 6 is adjusted in that the inclination of the first axis of rotation 1 of the grinding wheel 7 can be varied with respect to the second axis of rotation 2 of the connecting shaft 10. For this purpose, the first bearing holder 9 is mounted rotatably on the connecting shaft 10 via a first intermediate bearing 22. The first intermediate bearing 22 has a fourth axis of rotation 4 which, for its part, is inclined with respect to the second axis of rotation 2 of the connecting shaft 10. Consequently, two bearings are arranged in the bearing holder 9, namely the first bearing 8, the inner bearing ring of which is fastened to the grinding wheel 7, and the first intermediate bearing 22, the inner bearing ring of which is fastened to the connecting shaft 10. The bearing plane of the first intermediate bearing 22 is pivoted with respect to the horizontal plane, that is to say with respect to the radial plane, by 4° perpendicularly to the second axis of rotation 2 of the connecting shaft 10. Consequently, the fourth axis of rotation 4 of the first intermediate bearing 22 is pivoted by 4° with respect to the second axis of rotation 2 of the connecting shaft 10.

The plane of the first bearing 8 is pivoted in turn by 4° with respect to the plane of the first intermediate bearing 22. Consequently, the first axis of rotation 1 of the grinding wheel 7 is likewise pivoted by 4° with respect to the fourth axis of rotation 4 of the first intermediate bearing 22. In the position of the connecting shaft 10 and of the bearing holder 9 that is illustrated in FIG. 1, said oblique positions add up, and therefore the overall oblique position of the first axis of rotation 1 of the grinding wheel 7 with respect to the vertical second axis of rotation 2 of the connecting shaft 10 has an angle of 8°.

Figure 4:
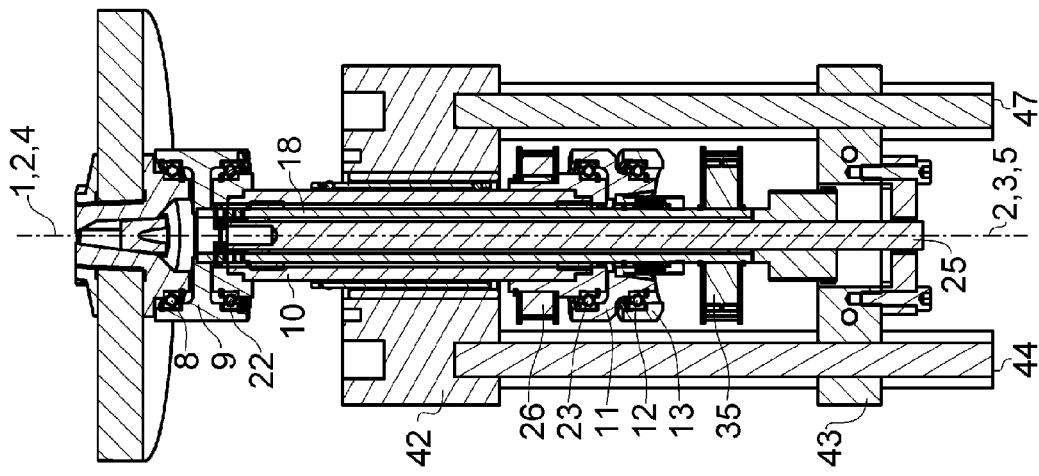
FIGS. 3 and 4 show a sectioned side view and a front view of the grinding device from the preceding figures with a maximum slant of the grinding wheel, corresponding to FIG. 1.
Figure 3:
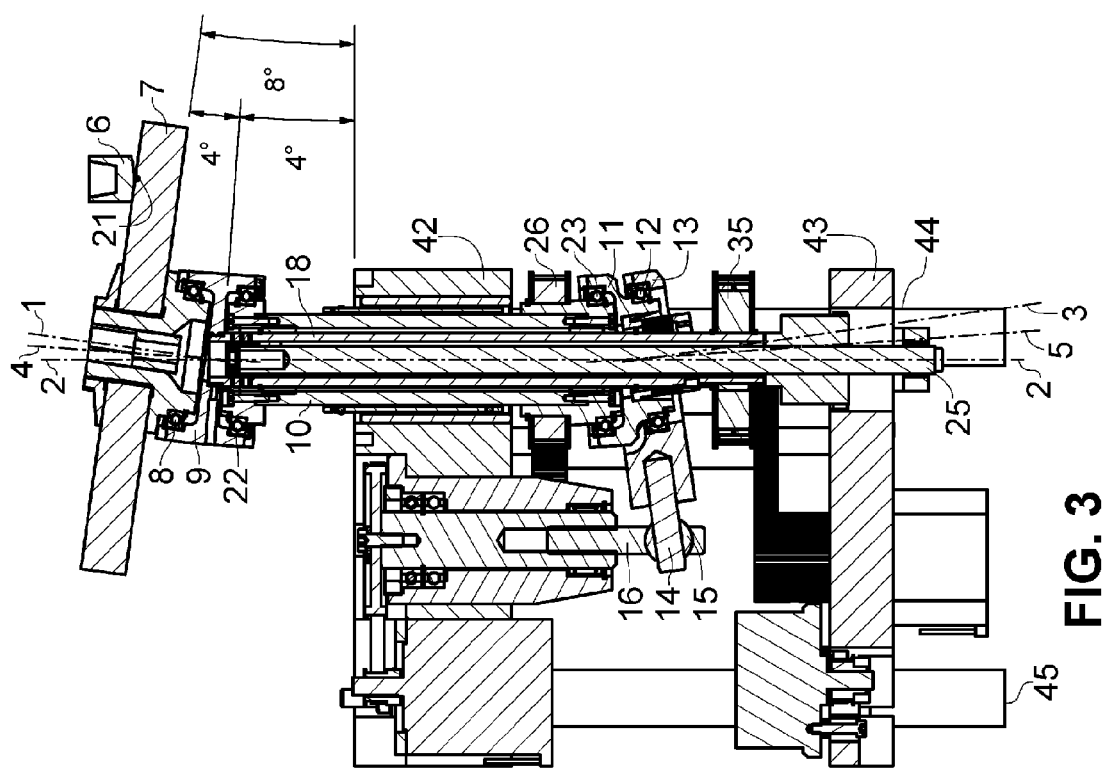

FIG. 1 and FIGS. 3 and 4 show this position, in which the grinding wheel 7 is at the maximum inclination with respect to the horizontal and radial plane of the connecting shaft 10. All of the axes of rotation 1-5 extend in the sectional planes of FIGS. 1 and 3. Consequently, the projections of said axes of rotation 1-5 lie on a straight line in the sectional plane of FIG. 4, which is rotated by 90°. When the connecting shaft 10 revolves, the contact line of the upper surface of the grinding wheel 7 with the workpiece 6 moves along a conical surface with an opening angle of 164°.

The connecting shaft 10 can be rotated with respect to the first bearing holder 9. Upon a rotation through 90°, the slant of the first axis of rotation 1 of the grinding wheel 7 with respect to the vertical second axis of rotation 2 of the connecting shaft 10 is halved. This position is illustrated in FIGS. 5 and 6. In these figures, the axes of rotation 1, 3, 4 and 5 extend in vertical planes which are in each case pivoted through 45° with respect to the sectional planes in FIG. 5 and FIG. 6. The projection of the fourth axis of rotation 4 of the intermediate bearing 22 into the sectional plane of FIG. 5 has an inclination with respect to the second, vertical axis of rotation 2 of the connecting shaft 10 of 2°. The projection of the first axis of rotation 1 of the grinding wheel 7 into the sectional plane of FIG. 5 likewise has an angle of 2° with respect to the projection of the second axis of rotation 2 of the connecting shaft 10, and therefore the overall inclination of the grinding wheel 7 with respect to the horizontal radial plane of the connecting shaft 10 in the sectional plane of FIG. 5 has an angle of 4°.

In the sectional plane, which is rotated by 90°, of FIG. 6, the projection of the fourth axis of rotation 4 with respect to the second axis of rotation 2 of the connecting shaft 10 has an angle of 2°, and the projection of the first axis of rotation 1 with respect to the fourth axis of rotation 4 likewise has an angle of 2°, but in the opposite direction. These slants neutralize each other, and therefore the projection of the axis of rotation 1 in FIG. 6 runs vertically. The actual slant of the grinding wheel 7 with respect to the horizontal plane corresponds to the 4° illustrated in FIG. 5. Consequently, when the connecting shaft 10 revolves and the bearing holder 9 simultaneously and synchronously rotates, the contact line of the grinding wheel 7 with the workpiece 6 moves along a conical surface with an opening angle of 172°.

Figure 8:
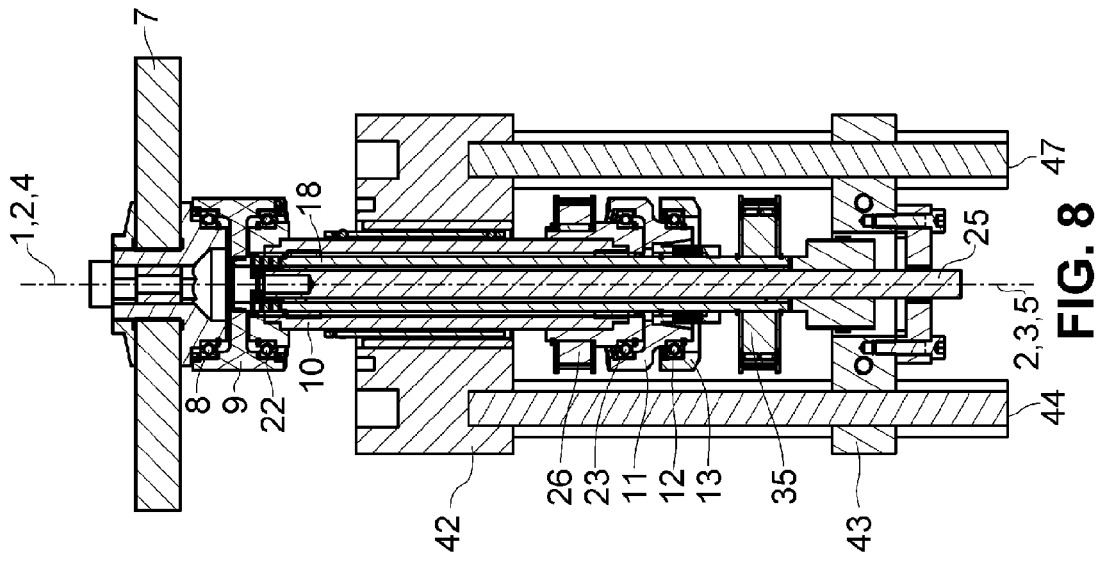
FIG. 7 and FIG. 8 show a sectioned side view and a front view of the grinding device from the preceding figures with a minimum slant of the grinding wheel.
Figure 7:
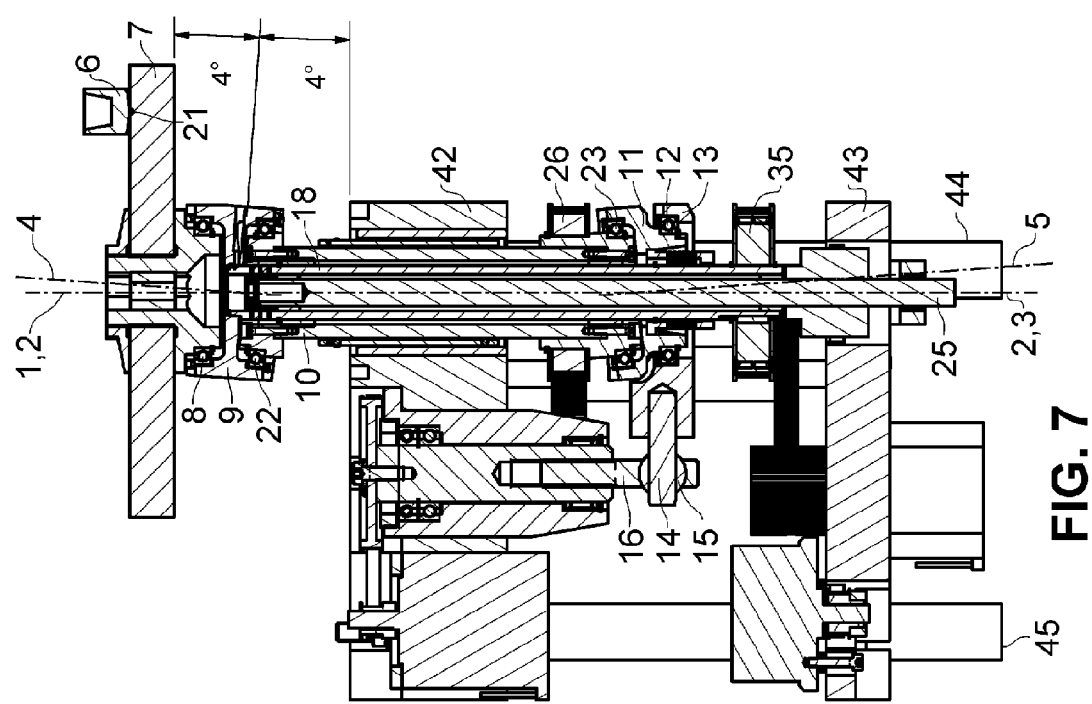

If the connecting shaft 10 is rotated further with respect to the first bearing holder 9, the slant is further reduced. In FIGS. 7 and 8, the grinding device is illustrated with a further rotation of the connecting shaft 10 with respect to the bearing holder 9 by 90° such that the connecting shaft 10 is rotated by 180° with respect to the position thereof with respect to the bearing holder 9 in FIG. 1 or 3. All of the axes of rotation 1, 2 and 4 now extend again in the vertical sectional plane of FIG. 7. The projection thereof onto the sectional plane, which is rotated by 90° with respect thereto, of FIG. 8 again lies on a line. In this position, the inclinations of the fourth axes of rotation 4 of the intermediate bearing 22 and of the second axis of rotation 2 of the connecting shaft 10 are directed with the same value in opposite directions. The fourth axis of rotation 4 of the first intermediate bearing 22 is inclined to the right with respect to the second axis of rotation 2 of the connecting shaft 10. By contrast, the first axis of rotation 1 of the first bearing 8 is inclined to the left in the opposite direction with respect to the fourth axis of rotation 4 of the first intermediate bearing 22. The two inclinations mutualize each other, and therefore the first axis of rotation 1 of the first bearing 8 for the grinding wheel 7 runs substantially parallel to the second axis of rotation 2 of the connecting shaft 10. In this case, the inclination between the surface of the grinding wheel 7 and the end surface of the workpiece 6 has an angle of 0°. With the requirement that the second axis of rotation 2 of the connecting shaft 10, and therefore also the first axis of rotation 1 which is parallel thereto, runs vertically, in this case the grinding wheel 7 lies horizontally, that is to say, at an angle of 90° to the axes of rotation 1 and 2. In this relative position of connecting shaft 10 and bearing holders 9 and 11 with respect to one another, the height of the point 21 in the region of the grinding wheel 7 does not change even if the bearing holders 9, 11 are rotated because the retaining ring 13 is mounted rotatably in a horizontal plane.

In a corresponding manner, the second bearing holder 11 is fastened to the connecting shaft 10 via a second intermediate bearing 23 so as to be rotatable about a fifth axis of rotation 5. The fifth axis of rotation 5 has an angle of 4° with respect to the second axis of rotation 2 of the intermediate shaft 10, and also the third axis of rotation 3 of the second bearing 12 in the bearing holder 11 has an angle of 4° with respect to the fifth axis of rotation 5 of the second intermediate bearing 23. By means of rotational coupling of the two bearing holders 9 and 11 by means of the coupling shaft 18, it is ensured that the axis of rotation 1 of the first bearing 8 and the axis of rotation 3 of the second bearing 12 always extend in the same vertical plane.

The inner bearing shells of the first intermediate bearing 22 and of the second intermediate bearing 23, which bearing shells are in each case fastened to the upper and to the lower end of the connecting shaft 10 with an inclination of 4° with respect to the radial plane of the connecting shaft 10, are also coupled to one another in the direction of rotation by the connecting shaft 10. By rotation of the connecting shaft 10, the two inner bearing rings of the intermediate bearings 22 and 23 are rotated synchronously. The axes of rotation 4 and 5 thereof are also always located in the same vertical plane, wherein the plane of the axes of rotation 4 and 5 of the intermediate bearings 22 and 23 can be rotated with respect to the plane of the axes of rotation 1 and 3 by rotation of the coupling shaft 18 with respect to the intermediate shaft 10.

In the case of the axis of rotation 2, which is vertical in the drawings, of the connecting shaft 10, the plane of the lowermost second bearing 12 always takes up an inclination with respect to the horizontal, the value of which inclination corresponds to the inclination of the first bearing 8 for the grinding wheel 7 with respect to the horizontal, but points in an opposite direction. This leads in turn to the above-explained effect that, irrespective of which inclination is set by means of the inclination adjustment device by rotation of the connecting shaft 10 with respect to the two bearing holders 9 and 11 on the coupling shaft 18, the point 21 in the region of the grinding wheel 7 is always located at the same height when the abutment 15 remains stationary.

The inclination of the grinding wheel 7 with respect to the workpiece 6 is adjusted by the inclination adjustment device. It is possible to produce a spherical surface on the stationary welding electrode 6 by a continuously wobbling grinding wheel 7, the angle of inclination of which is adjusted slowly and constantly between the minimum value) (0° and the maximum value)(8°.

During this operation, it is always ensured that there is good grinding contact between the grinding wheel 7 and the workpiece 6 since the pressing drive 17 presses the grinding wheel 7 at a constant force, regulated via a constant torque of the grinding wheel drive 24, against the workpiece 6.

Figure 11:
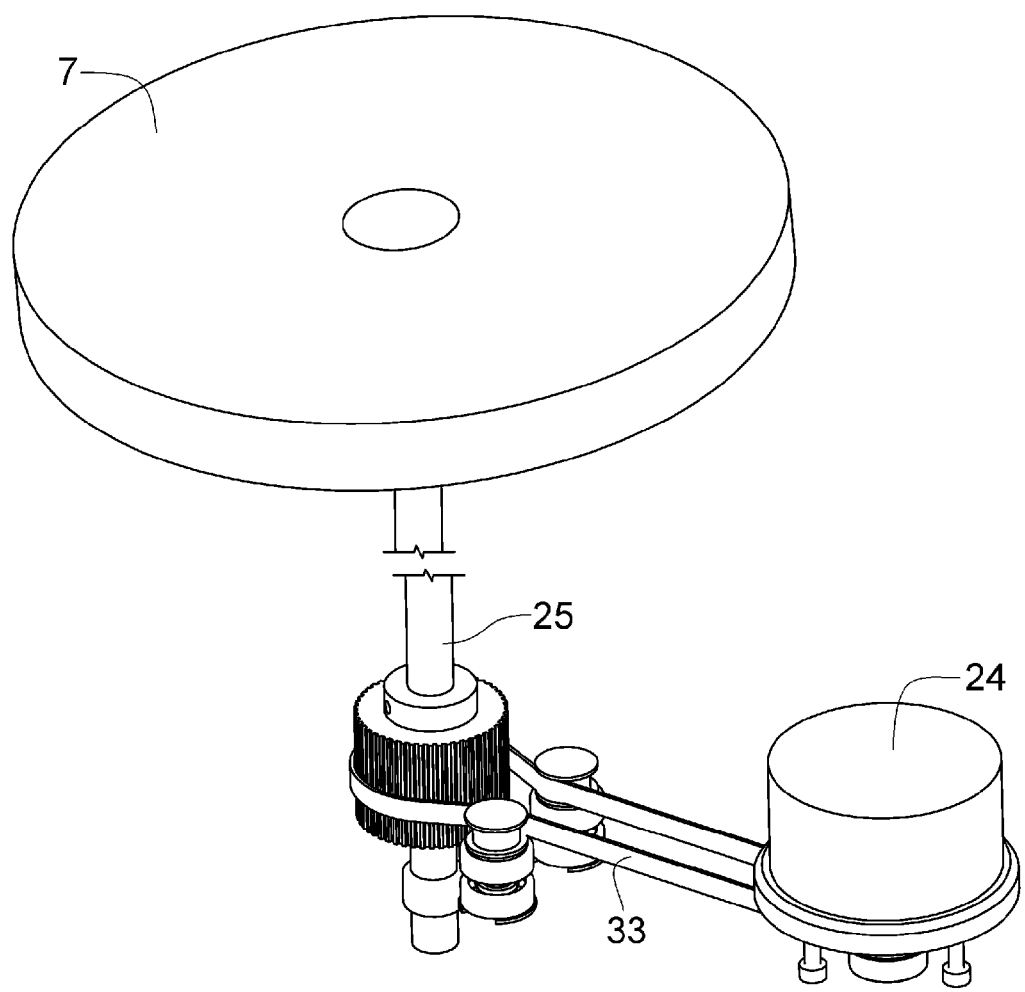
FIG. 11 shows an isolated perspective illustration of the grinding wheel drive.

The grinding wheel drive 24 is illustrated in isolated form in FIG. 11. It consists of an electric motor 24 which, via a toothed belt 33, drives the drive shaft 25 running within the coupling shaft 18. The rotational velocity of the grinding wheel 7 is a multiple of the rotational velocity of the coupling shaft 18 or of the connecting shaft 10.

Figure 10:
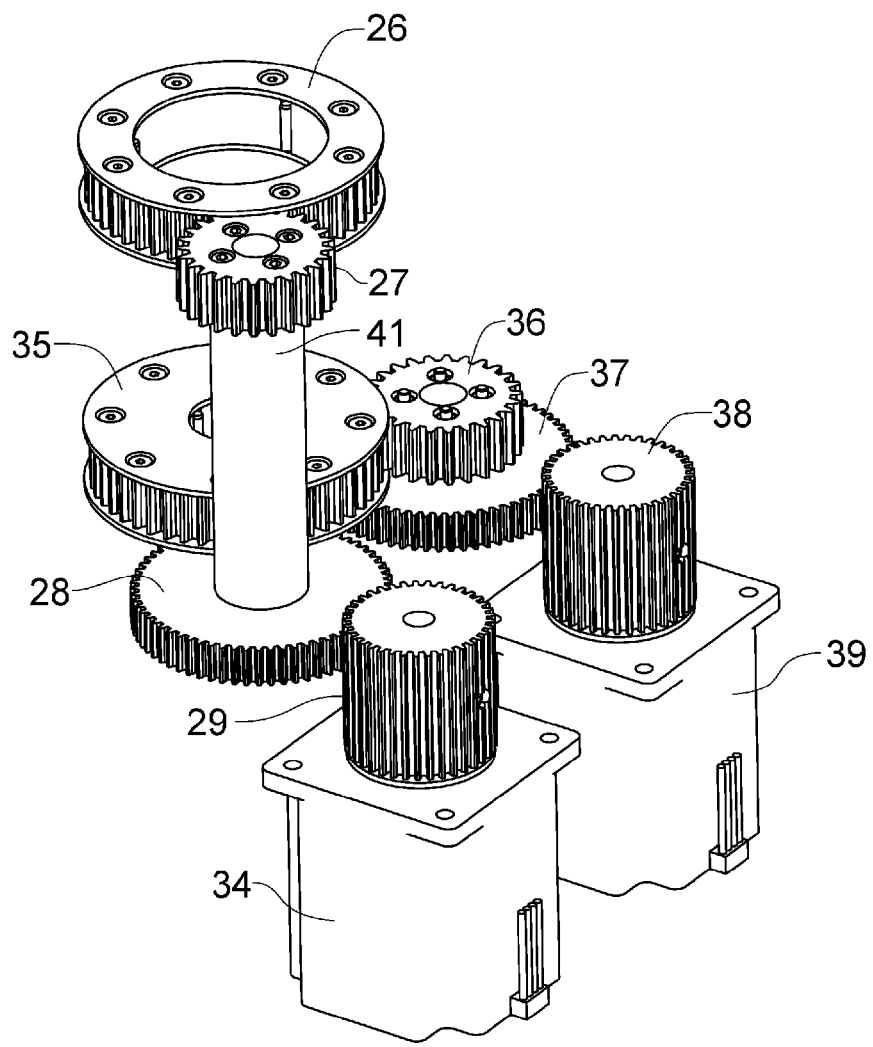
FIG. 10 shows an isolated perspective illustration of the drives for the connecting shaft and the coupling shaft.

Finally, the drives for the connecting shaft 10 and the coupling shaft 18 are illustrated in FIG. 10. Above the second bearing holder 11, a first gearwheel 26 is fastened on the connecting shaft 10 (see FIG. 1). The first gearwheel 26 meshes with a first driving gearwheel 29 on the motor shaft of a first electric drive motor 34 via two intermediate gearwheels 27, 28 arranged on a common shaft 41. Consequently, the electric drive motor 34 forms the first actuator for rotating the connecting shaft 10 about the axis of rotation 2 thereof. The first driving gearwheel 29 has an elongate toothing and meshes with the vertically displaceable intermediate gearwheel 28. The two vertically displaceable intermediate gearwheels 27, 28 are displaced by the pressing drive 17 in the vertical direction, i.e. parallel to the second axis of rotation 2 of the connecting shaft 10.

A second gearwheel 35 is fastened to the lower end of the coupling shaft 18 below the retaining ring 13 (see FIG. 1), which gearwheel 35 meshes via intermediate gearwheels 36, 37 (FIG. 10) with a second driving gearwheel 38 on the motor shaft of a second electric drive motor 39. The second driving gearwheel 38 likewise has an elongate toothing and meshes with the vertically displaceable intermediate gearwheel 37 which is connected fixedly to the intermediate gearwheel 36. This pair of intermediate gearwheels 36, 37 is also displaced by the pressing drive 17 in the vertical direction, i.e. parallel to the axis of the connecting shaft 10 and the coupling shaft 18.

The two electric drive motors 34, 39 are computer-controlled. They can rotate either at the same rotational velocity or with a rotational velocity differing from one another.

If the two shafts, namely the connecting shaft 10 and the coupling shaft 18, are rotated at the same rotational velocity, when the first axis of rotation 1 of the grinding wheel 7 is at a constant angle of inclination with respect to the second axis of rotation 2 of the connecting shaft 10, the wobbling movement of the grinding wheel 7 with a constant inclination with respect to the horizontal is produced, and, by means of the position adjustment device with the retaining ring 13, the height position of the grinding wheel 7 is controlled synchronously with the wobbling movement, and therefore the grinding wheel 7 machines a cone around the point 21 on the surface of the grinding wheel 7.

If the two gearwheels 26 and 35 rotate at a different rotational velocity, the coupling shaft 18 also rotates with respect to the connecting shaft 10. As a result, the angle of inclination of the first axis of rotation 1 of the grinding wheel 7 with respect to the second axis of rotation 2 of the connecting shaft 10 periodically changes and consequently so too does the third axis of rotation 3 of the retaining ring 13 with respect to the second axis of rotation 2 of the connecting shaft 10. By this means, as explained, the angle of the cone which is ground around the point 21 on the surface of the grinding wheel 7 changes. The surface produced on the workpiece 6 can thereby be varied and, for example, in the event of a slow and continuous change in angle, can be approximated to the shape of a sphere.

Consequently, the second drive motor 39 forms the second actuator which can bring about a rotation of the connecting shaft 10 in relation to the coupling shaft 18, to the ends of which the first bearing holder 9 and the second bearing holder 11 are fastened. This rotation is achieved in that the second actuator 39 rotates with a different angular velocity than the first actuator. No rotation takes place at the same angular velocity.

It is noted that the second axis of rotation 2 of the connecting shaft does not have to run vertically as in the described exemplary embodiment. If the second axis of rotation 2 runs, for example, horizontally, the surface of the grinding wheel 7 runs with a small inclination with respect to the vertical plane, i.e. upright, during operation, and therefore grinding dust is not deposited on the surface. Of course, in the event of a change in the alignment of the second axis of rotation 2, the meaning of the terms "at the top", "at the bottom", "on the right", "on the left", "vertically" and "horizontally" used in this description of the drawings change in such a manner that the upper end of the second axis of rotation, is, for example, the end close to the grinding wheel and "vertically" means parallel to the second axis of rotation 2. The angles of slant between the axes of rotation of the intermediate bearings and the connecting shaft or between the axes of rotation of the bearings and the intermediate bearings are also not restricted to the 4° of the exemplary embodiment, but rather can be varied within wide angular ranges.

Since the contact between the grinding wheel 7 and the workpiece 6 in order to produce a conical or spherical surface on the workpiece 6 always arises in the region of the point 21, there is the risk of a pronounced furrow arising on the grinding wheel 7 in the region of the point 21. This effect is already counteracted by the fact that the workpiece 6 is stationary with respect to the second axis of rotation 2 of the connecting shaft 10, but the first axis of rotation 1 of the grinding wheel 7 is inclined with respect to the second axis of rotation 2 and is rotated about said second axis of rotation 2. The second axis of rotation 2 does not run here through the centerpoint of the grinding wheel 7, and therefore the centerpoint of the grinding wheel 7 moves in a circular manner around the second axis of rotation 2. This has the result that the radial distance of the workpiece 6 from the centerpoint of the grinding wheel 7 periodically slightly changes during this rotation and that that surface of the grinding wheel 7 which is effective during the grinding extends over a broader annular strip on the grinding wheel 7. Consequently, the wear is also distributed over a quite broad region of the grinding wheel 7. This movement of the grinding wheel 7 with respect to the axis of rotation 2 of the connecting shaft 10 can also be observed at the opposite end of the connecting shaft 10 by a movement of the retaining ring 13. It is compensated for by the axial displaceability of the fastening pin 14 in the abutment 15.

In order to distribute the wear over an even larger region of the grinding wheel 7, the pressing drive 17 can be used during the grinding operation. The workpiece 6 can be displaced radially with respect to the point 21 during the grinding or in the event of consecutive grinding operations. The grinding wheel 7 is also at the respective angle, which is set by the abovementioned adjustment devices, to the radial surface of the workpiece 6 at a distance from the point 21. Since, however, the height compensation by means of the retaining ring 13 is configured with respect to the point 21, the height compensation will no longer function when a workpiece 6 is displaced with respect to the point 21. This has the consequence, in the event of a stationary abutment 15, that, depending on the position of the various adjustment devices, the grinding wheel 7 is raised from the workpiece 6 or is pressed with too great a force against the workpiece 6. This erroneous height position of the grinding wheel 7 can be compensated for by the pressing drive 17. As already mentioned, the pressing drive 17 can be controlled in such a manner that a predetermined torque of the grinding wheel drive 24 always prevails. The pressing drive 17 shifts the abutment 15 here in such a manner that the grinding wheel 7 is always pressed with an optimum pressing force against the workpiece 6. By shifting the axis of symmetry of the workpiece 6 with respect to the point 21, the wear region of the grinding wheel 7 is enlarged and the service life of the grinding wheel 7 is increased.

In the drawings, the workpiece 6 is pressed exclusively against the upper side of the grinding wheel 7. It should be noted that the workpiece 6 can also be pressed against the lower side of the grinding wheel 7, wherein the workpiece 6 is also machined along a conical surface, optionally with an adjustable angle. In practice, welding tongs have two electrodes which are pressed successively from both sides against the grinding wheel 7. During the machining of the upper welding electrode 6, the latter can be pressed from above against the grinding wheel 7, as illustrated in the drawings. If the lower welding electrode is ground, it can be pressed from below against the grinding wheel 7. The welding electrodes can be positioned here by the welding tongs on both sides of the grinding wheel 7, wherein the pressing drive 17 shifts the grinding wheel 7 parallel to the second axis of rotation 2 of the connecting shaft 10 and therefore first of all one side of the grinding wheel is pressed against one of the welding electrodes and then the second, opposite side of the grinding wheel 7 is pressed against the second welding electrode.

The previously described embodiment of the invention system described herein with the two separate drive motors 34 and 39, firstly, for rotating the connecting shaft 10, which forms the bearing rotation device, and, secondly, for rotating the coupling shaft 18, the difference in rotational speed of which with respect to the connecting shaft 10 brings about an adjustment in inclination, permits the maximum flexibility by means of numerical control of the drive motors 34 and 39. The grinding wheel 7 can be moved in a specific manner according to any patterns of movement within the kinematics of the arrangement in order to realize the desired machining of the workpiece.

Figure 12:
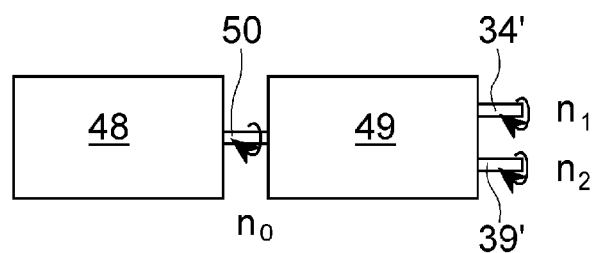
FIG. 12 shows a schematic diagram of a simplified form of the actuators for the rotation of the bearings and for the adjustment of the inclination.

However, it may also be necessary to machine exclusively one type of workpiece in a single machining operation with the above-described device during the lifetime of the device. In this case, the bearing rotation device and the inclination adjustment device can follow exactly the same pattern of movement during each machining cycle. This pattern of movement can be fixedly predetermined in the device, for example by mechanical coupling of the driven shafts 10 and 18. Such a coupling is illustrated schematically in FIG. 12. In this case, the two actuators 34' and 39' can be formed by the gear output shafts of a gearing 49 which is driven by a single, common drive motor 48. The common drive motor 48 drives the gear input shaft 50. The gearing can be provided with two only slightly different gearwheel sets which transmit the rotation of the gear input shaft to two gear output shafts 34' and 39'. The gear input shaft 50 rotates with the rotational speed $n_0$ which can be lower than the rotational speeds $n_1$ and $n_2$ of the gear output shafts. By use of such a reduction gearing, an inexpensive drive motor 48 having a high rotational speed and low torque can be used. The rotational speed $n_1$ of the first gear output shaft 34' can differ from the rotational speed $n_2$ of the second gear output shaft 39', for example by 1% to 4%. As a result, in the event of 100 revolutions of the first gear output shaft 34', between 1 and 4 revolutions of the first gear input shaft 34' in relation to the second gear input shaft 39' arise. In the event of a half revolution of the first gear input shaft 34' in relation to the second gear input shaft 39', an adjustment of the inclination in the entire adjustment range from the minimum value 0° to the maximum value 8° takes place. This adjustment is coupled to 12.5 to 50 revolutions of the bearing rotation device, and therefore, during passage through the entire adjustment range, a fixed number of revolutions of the bearing rotation device is predetermined, said number resulting in spiral grinding tracks on the workpiece (welding electrode) 6 with different cone angles. This fixedly predetermined coupling of the movement of bearing rotation device and inclination adjustment device is cost-effective and ensures a machining of the electrodes with reproducible movement sequences and uniform machining results. The two gear output shafts 34' and 39' can then themselves be coupled to the connecting shaft 10 and the coupling shaft 18 via a suitable coupling means (for example, gearwheel, toothed belt, etc.). It is also possible in this embodiment to allow the two gear output shafts 34' and 39' to rotate at the same rotational speed such that a constant angle is machined. Said constant angle can be changed in value, for example manually, by the two gear output shafts 34' and 39' being rotated with respect to each other.

However, the gearing 49 may also be configured as a variable-ratio gearing with two drive motors in such a manner that a first motor applies the torque for driving the connecting shaft 10 and the coupling shaft 18 and that a second motor impresses a difference in rotational speed on the shafts 10 and 18 mentioned. This drive variant has all the adjustment possibilities of the above-described solution with positionally controlled drives, but manages with two simple motors which are regulated in terms of rotational speed.

Any other drive variants which, firstly, bring about a rotational movement of connecting shaft 10 and coupling shaft 18 with respect to the workpiece 6 and, secondly, bring about a relative rotational movement of the connecting shaft 10 and the coupling shaft 18 with respect to each other are possible.

It should be noted that details which describe a spatial orientation, such as, for example, "at the top", "at the bottom", "on the right", "on the left", "vertically" and "horizontally", relate merely to the illustrations in the attached drawings. In these drawings, the second axis of rotation 2 runs from the top downwards, i.e. vertically. In practice, the second axis of rotation 2 can take up any position in space. The orientations and positions of the other components of the device are then shifted in a corresponding manner. This is one of the advantages of the described grinding device. Since a wobbling movement of the grinding wheel 7 is brought about merely by rotation of the bearing rotation device about a second axis of rotation 2 inclined with respect to the first axis of rotation 1 of the grinding wheel 7 and not by a wobbling of the housing of the drive motor for the grinding wheel, the device described can be arranged in any orientation in space and can be adapted to the space conditions provided. In particular, a substantially horizontal orientation of the second axis of rotation 2, in which the grinding wheel 7 is upright and grinding dust drops downwards because of gravity, may be expedient.

The features of the invention that are disclosed in the present description, in the drawings and in the claims may be essential both individually and in any combinations for realizing the invention in the various embodiments thereof.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:

1. A device for grinding solid workpieces, comprising:
    a flat grinding wheel;
    a first bearing for rotatable mounting of the grinding wheel about a first axis of rotation; and
    a grinding wheel drive, which is coupled to the grinding wheel, for rotating the grinding wheel, wherein the first bearing is rotatable about a second axis of rotation, wherein the first axis of rotation is inclined with respect to the second axis of rotation such that the grinding wheel bears obliquely against the surface of the workpiece and grinds, during the rotation about the second axis of rotation, a substantially conical surface to the workpiece when the workpiece is in contact with the grinding wheel surface at a distance from the second axis of rotation.

2. The device according to claim 1, further comprising:
    a first actuator that brings about the rotation of the first bearing.

3. The device according to claim 1, wherein the first bearing is rotatable about a second axis of rotation using a bearing rotation device, the bearing rotation device including a first bearing holder in which the first bearing is arranged and which is rotatable about the second axis of rotation.

4. The device according to claim 1, wherein the second axis of rotation is inclined by less than 15° with respect to the first axis of rotation.

5. The device according to claim 4, wherein the second axis of rotation is inclined by less than 10° with respect to the first axis of rotation.

6. The device according to claim 1, wherein a lower surface and/or an upper surface of the grinding wheel runs at a right angle to the first axis of rotation.

7. The device according to claim 1, further comprising:
    a position adjustment device which moves the first bearing substantially in a direction parallel to the second axis of rotation.

8. The device according to claim 7, wherein the position adjustment device includes:
    a connecting shaft which is rotatable about the second axis of rotation, is axially displaceable and is connected to the first bearing holder;
    a second bearing holder which is connected to the connecting shaft;
    a retaining ring with a second bearing on which the second bearing holder is mounted so as to be rotatable about a third axis of rotation, wherein the third axis of rotation is inclined with respect to the second axis of rotation of the connecting shaft; and
    a fastening pin which is fastened to the retaining ring and is mounted pivotably in or on an abutment.

9. The device according to claim 8, wherein a value of an angle of inclination between the first axis of rotation and the second axis of rotation corresponds to a value of an angle of inclination between the second axis of rotation and the third axis of rotation.

10. The device according to claim 8, wherein the fastening pin is held in an axially displaceable manner in the abutment.

11. The device according to claim 1, further comprising:
    an inclination adjustment device with which a value of an angle of inclination between the first axis of rotation and the second axis of rotation is adjustable.

12. The device according to claim 11, wherein the inclination adjustment device includes:
    a first intermediate bearing with which the first bearing holder is fastened to the connecting shaft so as to be rotatable about a fourth axis of rotation;
    a second intermediate bearing with which the second bearing holder is fastened to the connecting shaft so as to be rotatable about a fifth axis of rotation, wherein the fourth axis of rotation and the fifth axis of rotation are in each case inclined with respect to the second axis of rotation of the connecting shaft; and
    a second actuator which brings about a rotation of the connecting shaft in relation to the first bearing holder and the second bearing holder.

13. The device according to claim 12, wherein the second actuator is driven by a common drive motor with a first actuator that brings about the rotation of the first bearing.

14. The device according to claim 12, wherein a value of an angle of inclination between the fourth axis of rotation and the second axis of rotation corresponds to a value of an angle of inclination between the fifth axis of rotation and the second axis of rotation.

15. The device according to claim 12, wherein an angle between the first axis of rotation and the fourth axis of rotation, an angle between the fourth axis of rotation and the second axis of rotation, an angle between the second axis of rotation and the fifth axis of rotation, and an angle between the fifth axis of rotation and the third axis of rotation all have the same value.

16. The device according to claim 13, wherein the first actuator and the second actuator are numerically controlled by a control device.

17. The device according to claim 1, further comprising:
a pressing drive with which the grinding wheel is pressed against the workpiece.

18. The device according to claim 17, wherein a torque of the grinding wheel drive is detected and, when a predetermined value of the torque is reached, the pressing drive is stopped.

19. A method for grinding solid workpieces, comprising:
setting a flat grinding wheel into rotation about a first axis of rotation, wherein the grinding wheel is mounted in a first bearing so as to be rotatable about the first axis of rotation; and
rotating the first bearing about a second axis of rotation, wherein the first axis of rotation is inclined with respect to the second axis of rotation, wherein the grinding wheel bears obliquely against the surface of the workpiece and grinds, during the rotation about the second axis of rotation, a substantially conical surface to the workpiece when the workpiece is in contact with the grinding wheel surface at a distance from the second axis of rotation.

20. The method according to claim 19, further comprising:
moving the first bearing substantially along the second axis of rotation using a position adjustment device.

21. The method according to claim 19, characterized in that a value of an angle of inclination between the first axis of rotation and the second axis of rotation is adjusted using an inclination adjustment device.

22. The method according to claim 21, wherein the position adjustment device is coupled to the inclination adjustment device, and wherein the position adjustment device brings about a periodic movement of the first bearing, which movement is coupled to the rotation of the first bearing about the second axis of rotation, with an amplitude which increases as the angle of inclination increases.

23. The method according to claim 19, further comprising:
in a first grinding operation, pressing the first side of the grinding wheel against a first workpiece, and, in a second grinding operation, pressing the second, opposite side of the grinding wheel against a second workpiece.

* * * * *